(12) United States Patent
Suzuki et al.

(10) Patent No.: US 7,078,112 B2
(45) Date of Patent: Jul. 18, 2006

(54) MECHANICAL FUSE AND PRODUCTION METHOD FOR THE SAME

(75) Inventors: Takashi Suzuki, Kashiwa (JP); Tadayuki Tsutsui, Matsudo (JP); Kei Ishii, Higashi Katsushika-gun (JP); Yoshihiro Tanimura, Chiryu (JP)

(73) Assignees: Hitachi Powdered Metals Co., Ltd., Matsudo (JP); Denso Corporation, Kariya (JP)

( * ) Notice: Subject to any disclaimer, the term of this patent is extended or adjusted under 35 U.S.C. 154(b) by 69 days.

(21) Appl. No.: 10/859,128

(22) Filed: Jun. 3, 2004

(65) Prior Publication Data

US 2005/0014016 A1    Jan. 20, 2005

(30) Foreign Application Priority Data

Jun. 13, 2003    (JP) .............................. 2003-168791

(51) Int. Cl.
  *B32B 15/18*    (2006.01)
  *B32B 15/04*    (2006.01)
  *B32B 5/18*    (2006.01)

(52) U.S. Cl. .................. 428/681; 428/304.4; 428/615; 428/627; 428/632

(58) Field of Classification Search ...................... None
See application file for complete search history.

(56) References Cited

U.S. PATENT DOCUMENTS

| | | | | |
|---|---|---|---|---|
| 3,956,531 A | * | 5/1976 | Church et al. ............... | 427/226 |
| 4,504,312 A | * | 3/1985 | Oaku et al. ................... | 75/244 |
| 4,518,563 A | * | 5/1985 | Suganuma et al. ........... | 419/29 |
| 4,696,696 A | * | 9/1987 | Fujita et al. .................. | 75/246 |
| 4,846,769 A | * | 7/1989 | Allen .......................... | 474/218 |
| 4,943,321 A | * | 7/1990 | Akutsu ........................ | 75/243 |
| 5,427,600 A | * | 6/1995 | Itoh et al. ..................... | 75/243 |
| 5,516,483 A | * | 5/1996 | Shivanath et al. ............ | 419/14 |
| 5,561,834 A | * | 10/1996 | Score .......................... | 419/19 |
| 5,703,304 A | * | 12/1997 | Lindberg et al. .............. | 75/243 |
| 5,800,137 A | * | 9/1998 | Eitai et al. ................... | 417/319 |
| 5,800,636 A | * | 9/1998 | Tsukada et al. ............. | 148/306 |
| 6,228,138 B1 | * | 5/2001 | Yamanishi et al. ........... | 75/231 |
| 6,332,842 B1 | * | 12/2001 | Tabuchi et al. ............... | 464/33 |

FOREIGN PATENT DOCUMENTS

| JP | 2002-168267 | * | 6/2002 |
|---|---|---|---|
| JP | A-2002-168267 | | 6/2002 |

OTHER PUBLICATIONS

JP 2002-168267 (English Machine Translation), Tadayuki et al., Mechanical Fuse and Manufacturing Method for the Fuse, Jun. 2002.*

* cited by examiner

*Primary Examiner*—Jennifer McNeil
*Assistant Examiner*—Jason L. Savage
(74) *Attorney, Agent, or Firm*—Oliff & Berridge, PLC (57) ABSTRACT

A mechanical fuse has further improved and stabilized fatigue limit ratio, and can obtain high reliability under a using condition in which cyclic loading is applied. The mechanical fuse includes a Fe-based sintered alloy that has at least one element of P at 0.15 to 1.5 mass %, Si at 0.4 to 2.0 mass %, and Mn at 1.0 to 4.0 mass %, and the remainder consisting of Fe and inevitable impurities. An iron oxide layer is formed on a pore inner wall and the pores have roundness of 0.004 or more. A method of production therefore is also provided.

5 Claims, 5 Drawing Sheets

MECHANICAL FUSE AND PRODUCTION METHOD FOR THE SAME

BACKGROUND OF THE INVENTION

1. Field of the Invention

The present invention relates to a mechanical fuse for disconnecting power transmission when an overload occurs in a power transmission device to ensure the safety of the device, and relates to a production method for the same.

2. Description of the Related Art

A mechanical fuse is provided, for example, in a power transmission device interposed between a driving side and a driven side (for example, between a driving shaft and a driven shaft) to transmit the rotational power of the driving side to the driven side. The fuse forces the disconnecting of power transmission when a large difference occurs between the driving side and the driven side during transmission of rotating power, thereby avoiding occurrence of lock-up or rupture due to propagation of overload torque to one side.

Such a mechanical fuse is generally composed of a rupturable member which sacrificially ruptures, disposed between two holding members held to the driving side and driven side so as to link these holding members. The rupturable member may specifically be a shear pin or a shear plate, which is required to rupture reliably when a specified torque or more is applied. In addition, the mechanical fuse may be embodied so as to unify the above two holding members, for example, an embodiment in which a boss portion is connected to the driving side (or the driven side) by forming a screw thread inside (or outside) thereof and a flange portion is connected to the driven side (or the driving side) by forming a screw thread outside (or inside) thereof. In an embodied connection of the boss portion and the flange portion, a difference portion corresponds to the above rupturable member, and the power transmission is forced to be disconnected by breaking the difference portion when a large differential operation occurs between the driving side and the driven side. Furthermore, in the embodiment, the screw phase of the driving side and that of the driven side may be changed to be the opposite phase from each other by selecting a rotational direction in which the screw tightens (torque affects the differential portion).

The magnitude of the torque which will cause rupture can be adjusted by selection of the material and the cross sectional area of the rupturable member; however, if the rupturable member is made of an unstable material which may be reduced in strength by fatigue due to repeated exposures to load, the reliability thereof is low, and it is therefore not practical. As a material to satisfy the requirements, hitherto, ceramics have been widely used because of stability in fatigue strength and high fatigue limit ratio (ratio of fatigue strength to tensile strength, determined by fatigue strength÷tensile strength).

However, although ceramics are stable in fatigue strength, they are expensive, and hence, less expensive mechanical fuses have been desired. There is also a need for a mechanical fuse in the form of rupturable members integrated with holding members at both sides and interposing a rupturable portion between holding portions for the purpose of improving assembling efficiency and general applicability, but the mechanical fuse in this form is not used at present because there are problems in that it is difficult to assure the strength of holding portions and because broken pieces scatter after rupturing.

In order to solve the problems described above, the present applicants proposed a mechanical fuse composed of Fe-based sintered alloy having pores having a roundness of 0.004 or more which is controlled by forming an iron oxide layer on a pore inner wall (Japanese Patent Publication No. 2002-168267A). According to this mechanical fuse, there is an advantage in that it is inexpensive, is superior in forming properties, and is high in fatigue limit ratio.

The mechanical fuse disclosed in Japanese Patent Publication No. 2002-168267A has a matrix strengthened by adding C; however, combined carbon content changes slightly due to effects of the sintering atmosphere, and fatigue limit ratio thereby varies somewhat. Therefore, in order to produce a fuse so that the fatigue limit ratio is stable, it is necessary to take measures in which the sintering atmosphere is strictly controlled, or the like.

In addition, since mechanical fuses have been recently used in environments in which high reliability is required, further improvement of the fatigue limit ratio is required, and in particular, high reliability under a use condition in which cyclic loading is loaded is required.

SUMMARY OF THE INVENTION

The present invention was made in order to solve the above problems, and it is therefore an object to provide a mechanical fuse which further improves the fatigue limit ratio of mechanical fuse previously proposed and has stable fatigue limit ratio without strict controlling, and a method for easily producing the mechanical fuse.

In a mechanical fuse according to the present invention, an effect of a sintering atmosphere is excluded by not adding graphite, that is, C for strengthening the matrix, and therefore, elongation of the matrix is decreased and fatigue limit ratio is increased by adding alloy elements instead of C.

That is, the mechanical fuse of the present invention is composed of Fe-based sintered alloy, wherein an iron oxide layer is formed on a pore inner wall, the pores have a roundness of 0.004 or more, and an overall composition comprises at least one element of P at 0.15 to 1.5 mass %, Si at 0.4 to 2.0 mass %, and Mn at 1.0 to 4.0 mass %, and the remainder consisting of Fe and inevitable impurities.

According to basic characteristics previously disclosed by the present inventors, since the mechanical fuse of the present invention is a sintered compact of an Fe-based material, it is easy to form even in complicated shapes, and can be produced at low cost. Since ferroalloys have a stable region of fatigue strength when exposed to stress repeatedly, and are relatively wide compared to nonferrous alloys, it is easy to design the rupturable portion, and in other words, since the rupture stress tends to remain constant, a high rupture reliability is obtained. In addition, since the Fe-based sintered alloy varies in tensile strength depending on degree of porosity, the density can be utilized as one variable of the design conditions of rupturable portion, and rupture stress is thereby more easily adjusted.

Furthermore, since the mechanical fuse of the present invention has round pores with a roundness of 0.004 or more, notch sensitivity is low, reduction of strength due to fatigue is reduced, and a high fatigue limit ratio is obtained. The roundness of pores is the ratio of actual area of a pore to the area of a virtual pore determined by peripheral circumference of the pore. When the peripheral circumference of a pore is represented by L and the area of pore is represented by S, the roundness is expressed as $4\pi S/L^2$, and the value is in a range of $0<\text{roundness} \leq 1$ (true circle). As the roundness approaches 1, it approaches that of a true circle, and this shows that the pores are round. When the roundness is 0.004 or more, notch sensitivity is lowered, the fatigue strength is improved, and the fatigue limit ratio is increased.

As the fatigue strength ratio (fatigue strength÷tensile strength) approaches 1, differences in cyclic loading in normal operation (fatigue strength) and breaking loading in irregular high loading (tensile strength) are decreased because the tensile strength is generally larger than the fatigue strength, and as a result, sensitive power can be disconnected and the mechanical fuse can be easily designed. Therefore, in the mechanical fuse, it is required that the fatigue strength ratio (fatigue strength÷tensile strength) be large rather than that absolute values of the fatigue strength and the tensile strength be large. That is, necessary strength is ensured by increasing the cross sectional area of the rupturable member, even if the material has low fatigue strength and low tensile strength. However, a material having high fatigue limit ratio, high fatigue strength, and high tensile strength is preferable because products thereof can be made lighten by decreasing the cross sectional area of the rupturable member.

The present inventors have performed research on alloy elements which can be added to Fe-based sintered alloy instead of C in addition to the above considerations, and consequently, they have found that P, Si, and Mn are preferable.

That is, since the sintered material has pores, elongation thereof generally varies more widely than that of a wrought material, and variation of the elongation of the material causes variation in strength. As a result, rupture stress is prevented from varying by decreasing the elongation so as to stabilize the fatigue limit ratio, and breaking loading is prevented from varying even if it is a sintered material. However, for materials which the present inventors previously researched, it was required to control the sintering atmosphere since the elongation may be adjusted by the amount of combined C.

Therefore, the present inventors have found that P, Si, and Mn may be used to strengthen the matrix instead of adding C, and consequently, without the effect of a sintering atmosphere, the elongation of the matrix is decreased, tensile strength and fatigue strength are stabilized, and fatigue limit ratio is stabilized, and therefore, the breaking loading can be prevented from varying.

In addition, P, Si, and Mn are more preferable since the matrix is strengthened by adding small amounts thereof and fatigue strength and tensile strength are thereby improved.

The present invention have been made based on the above knowledge, and has a new characteristic in which the overall composition comprises at least one element of P at 0.15 to 1.5 mass %, Si at 0.4 to 2.0 mass %, and Mn at 1.0 to 4.0 mass %, and the remainder consisting of Fe and inevitable impurities.

When addition amounts of the above P, Si, and Mn are less than 0.15 mass %, 0.4 mass %, and 1.0 mass %, respectively, fatigue strength ratio varies widely by increasing ductility of the matrix, and moreover, the strength is decreased by insufficiently strengthening of the matrix. In contrast, when the elements exceed 1.5 mass %, 2.0 mass %, and 4.0 mass %, respectively, the density is decreased by reducing compressibility of the powder, and the strength is thereby decreased.

As a method for obtaining such round pores, an activated sintering method in which the oxygen content is increased in a green compact before sintering and is reduced by sintering is known. In this method, specifically, the green compact is sintered after heating and oxidizing at high temperature, or treating in steam. In addition, round pores are also formed by a method for sintering at higher temperatures than ordinary sintering temperature (about 1100 to 1150° C.). Furthermore, by adding an element for generating much liquid phase in the sintered compact, the sintering can be promoted. By treating the Fe-based sintered alloy in steam as described below, moreover, an iron oxide phase is formed in the surface layer and pore inner wall, and round pores are thereby easily obtained.

The mechanical fuse of the present invention is preferably further processed by a mechanical process for imparting compressive residual stress, such as shot peening, mechanical plating, etc., in addition to a metallurgical process for imparting compressive residual stress such as soft nitriding, etc. In these processes for imparting compressive residual stress, the mechanical fuse surface is provided with residual compressive stress and is enhanced in fatigue strength, so that the fatigue limit ratio is further enhanced. In addition, the soft nitriding has not only an effect of imparting the compressive residual stress, but also has an effect of improving wear resistance by enhancing the surface hardness of the mechanical fuse. The process for providing mechanical residual stress and the soft nitriding process, if both are performed, may be performed in any order.

The mechanical fuse of the present invention preferably has its surface coated with a zinc chromate film. In the mechanical fuse coated with zinc chromate film, surface pores are sealed effectively, and oxidation is prevented by the zinc chromate film which is superior in corrosion resistance. As a result, reduction of rupture stress is suppressed, and the rupture reliability is further enhanced.

As a specific structure of the mechanical fuse of the present invention, it is interposed between two power transmission shafts, and includes an inner rim fixed to one power transmission shaft, an outer rim fixed to the other power transmission shaft, and plural arms for linking the inner rim and the outer rim, which are formed integrally.

According to this mechanical fuse, the arms include rupturable portions, and the arms are integrated with the inner rim and the outer rim. Because it is a unitary structure made of Fe-based sintered alloy, the fatigue limit ratio of arms (rupturable portions) and the mechanical strength of the inner rim and outer rim are maintained at high levels, and further assembling process is not necessary. Such a mechanical fuse may be used, for example, as a shaft coupling.

The production method for a mechanical fuse of the present invention is a production method which is optimal for the mechanical fuse of the present invention, and includes a compression step for compressing and forming into a specified shape by using a mixed powder which has mixed therein a molding lubricant in at least one powder chosen from the group of iron powder, Si powder, Fe—P alloy powder, Fe—Si alloy powder, and Fe—Mn alloy powder; a sintering step for sintering the green compact obtained in the compression step at a non-oxidizing atmosphere; and a steam treating step for treating the sintered compact obtained in the sintering process in steam, so as to obtain the overall composition comprising at least one element of P at 0.15 to 1.5 mass %, Si at 0.4 to 2.0 mass %, and Mn at 1.0 to 4.0 mass %, and the remainder consisting of Fe and inevitable impurities.

In the production method of the present invention, the material powder is a mixed powder in which powder of an additive element such as P, etc., is added with iron powder or iron alloy powder. As a result, the metallurgical binding of iron particles is promoted in a diffusion process of the additive element to iron while sintering, and the fatigue strength is enhanced while the matrix is reinforced by alloying.

In addition, since graphite powder is not used for strengthening the matrix, it is not affected by the effects of the sintering atmosphere, and it is possible to easily produce a mechanical fuse in which fatigue strength ratio is stable.

When each added amount of the above P, Si and Mn is less than 0.15%, 0.4% and 1.0%, respectively, the fatigue limit ratio varies widely by increasing the ductility of the matrix, and the matrix is insufficiently strengthened, and the strength is thereby decreased. In contrast, when each element exceeds 1.5%, 2.0% and 4.0%, the compressibility of the powder is decreased and the density is decreased, and the strength is thereby decreased.

The steam treatment is a treatment preformed on the sintered compact for forming an iron oxide ($Fe_3O_4$) in a high temperature steam atmosphere (for example, 370 to 380° C.), and the steam permeates from the surface layer of the sintered compact into the inner part, reaching the surface layer and the pore inner wall, and these parts corrode, and an iron oxide ($Fe_3O_4$) phase is formed. Such iron oxide phase forms round pores as described above, and the notch sensitivity is decreased. As a result, the tensile strength is reduced, but the fatigue strength is enhanced, and the fatigue limit ratio is increased. The steam treatment can be executed by using a mesh belt furnace or a pot furnace capable of maintaining a high atmospheric pressure, but the latter is advantageous because more oxide can be formed in deeper parts.

In addition, for the above powders, Fe—P alloy powder having a P content of 2.8 to 22.0 mass % is preferable. When the Fe—P alloy powder is used, since before the above steam treatment round pores were previously formed by forming a liquid phase during sintering, the roundness of the pores after the steam treatment is brought close to 1, and fatigue limit ratio can thereby be improved. When P content of the Fe—P alloy powder deviates from a range of 2.8 to 22.0%, a high sintering temperature is necessary in order to produce the liquid phase. Therefore, in the case of liquid-phase sintering performed in a temperature range generally used in sintering, Fe—P alloy powder having a P content of 2.8 to 22.0 mass % is preferable. However, sizes of products vary widely by excessively adding liquid phase elements, and therefore, it is necessary to control the addition amount of P to be under 1.5 mass % in the overall composition.

In the production method of the present invention, a soft nitriding process is preferably preformed after the steam treatment. As mentioned above, by the nitriding process, residual compressive stress is given, fatigue strength is improved, and fatigue limit ratio is further increased, and wear resistance is enhanced at the same time.

In the present invention, a process for providing mechanical compressive residual stress such as shot peening, mechanical plating, etc., is preferably executed between, or after, the sintering process, the steam treating process, and the soft nitriding process. As mentioned above, by the process for providing mechanical compressive residual stress, the fatigue strength is increased, and the fatigue limit ratio is enhanced.

In the final processing of the present invention, it is preferable that a film of flake particles of zinc or zinc-iron alloy be laminated on the surface by a mechanical plating process, and the composition be further immersed in an aqueous dispersion solution containing metal zinc flakes, chromic acid anhydride and glycol, and be then heated, so that the surface is coated with a zinc chromate film.

In the mechanical plating process, composite particles in which zinc particles or zinc-iron alloy particles are adhered around iron particles are sprayed on the sintered compact surface by the same technique as shot peening, and the surface is laminated with a film of flake zinc particles or zinc-iron alloy particles. In this case, iron core particles are driven away by the impact of spraying. Next, by immersing in an aqueous dispersion solution containing metal zinc flakes, chromic acid anhydride and glycol, and then heating, the zinc chromate film is baked. The temperature of this heating process is preferably about 300° C., and hexavalent chromium is reduced by organic compounds in this heating process, and water-insoluble amorphous $nCrO_3.mCr_2O_3$ is generated, which acts as a binder, and laminated zinc flakes are mutually bound, and a zinc chromate film is formed.

The mechanical fuse thus coated with the zinc chromate film is effectively sealed in the surface pores as mentioned above, and oxidation is prevented by the zinc chromate film which has superior corrosion resistance, and lowering of rupture stress is suppressed, and the rupture reliability is further enhanced.

DETAILED DESCRIPTION OF THE PREFERRED EMBODIMENTS

Embodiments of the present invention are described while referring to the accompanying drawings.

Figure 1:
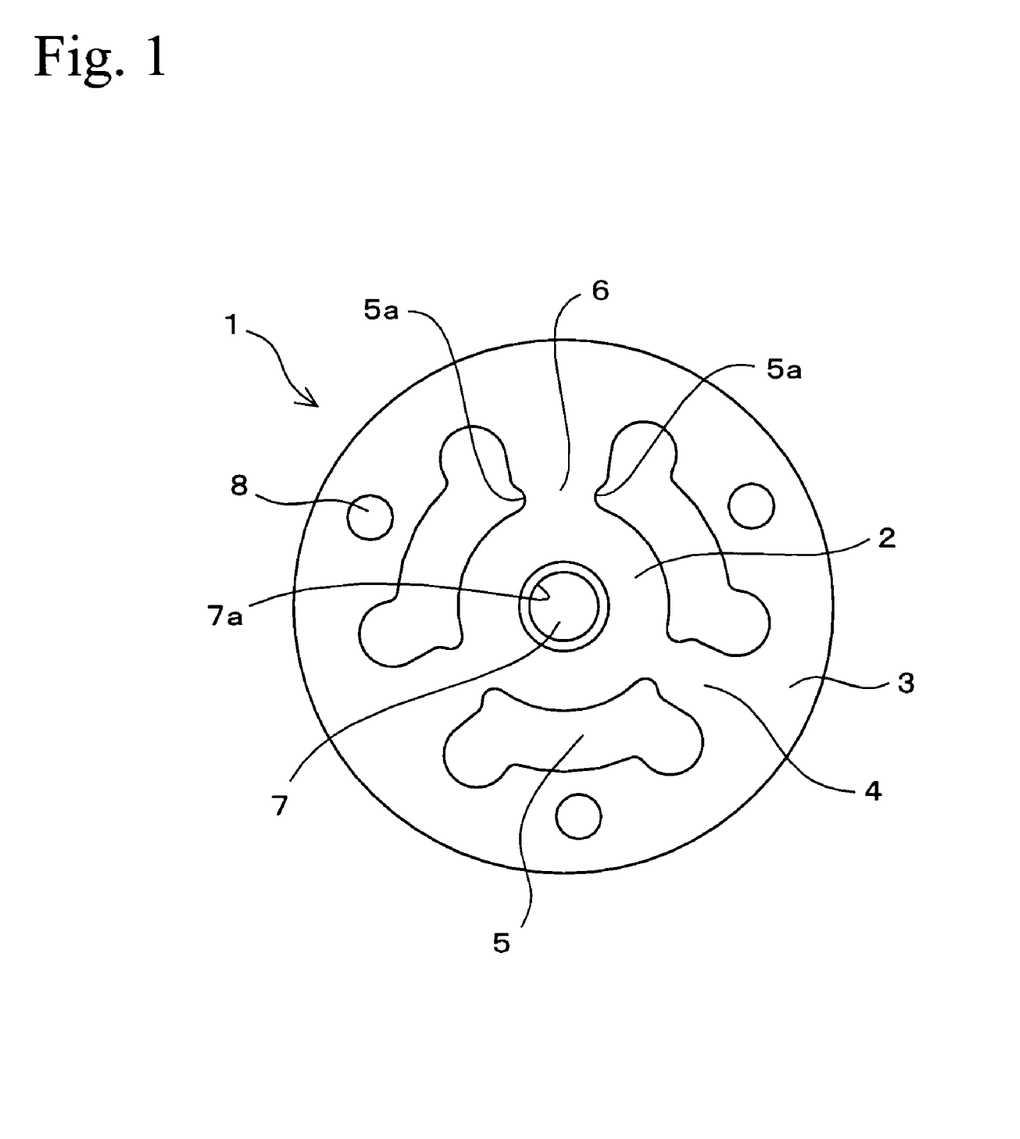
FIG. 1 is a front view of a mechanical fuse according to an embodiment of the present invention.

FIG. 1 shows a disc-shaped mechanical fuse 1 made of Fe-based sintered alloy in an embodiment of the present invention. The mechanical fuse 1 is interposed between two power transmission shafts (not shown), and comprises an inner rim 2 for fixing the end of one power transmission shaft, an outer rim 3 for fixing the end of the other power transmission shaft, and plural (three in this case) arms 4 for linking the inner rim 2 and outer rim 3, which are formed integrally.

The inner rim 2 and outer rim 3 are divided by plural (three in this case) circular slits 5 formed between them, and an inner peripheral side of the slits 5 is the inner rim 2, and an outer peripheral side is the outer rim 3. Adjacent slits 5 form arms 4 extending in the radial direction. The arms 4 form shear plates, and at the inner peripheral side end, a bottleneck portion which is narrow in width is formed so as to be held by a semicircular notch 5a forming a part of slits 5, and this bottleneck portion is set in a rupturable portion 6. The inner rim 2 and outer rim 3 have a specified wall thickness for assuring a strength necessary for a structural member.

A shaft hole 7 is formed in the center of the inner rim 2, and female threads 7a are formed in the inner circumference of the shaft hole 7 for engaging with male threads formed at the leading end of one power transmission shaft. The female threads 7a are formed after sintering. On the other hand, in the outer rim 3, bolt holes 8 for fixing the other power transmission shaft are formed at positions corresponding to the slits 5. In the mechanical fuse 1, one power transmission shaft is fixed to the inner rim 2 by tightening the male threads at the leading end to the female threads 7a, and the other power transmission shaft is fixed to the outer rim 3 by bolting through the bolt holes 8. That is, the two power transmission shafts are coaxially coupled by way of the mechanical fuse 1.

According to this mechanical fuse 1, for example, rotating power is transmitted from the power transmission shaft fixed to the inner rim 2 to the power transmission shaft fixed to the outer rim 3 by way of the mechanical fuse 1. In the midst of transmission of rotational power, if a large difference is caused between the two shafts and a specified rupture stress is applied to the rupturable portion 6, the rupturable portion 6 is broken and the power transmission is forcibly disconnected.

EXAMPLES

The effects of the present invention are shown by examples therefore. In the following explanation, the percentage relating to the mixing rate or composition is the percentage by mass.

A mixed powder of iron powder was prepared by adding Fe—P alloy powder, Si powder, and Fe—Si alloy powder to iron powder at a mixing ratio shown in Table 1 and by adding 0.75% of zinc stearate powder, and this mixed powder was compressed by a die assembly to a density of 6.5 g/cm$^3$, and a green compact was obtained. This green compact was sintered in a reducing gas atmosphere at 1130° C., and a sintered compact was obtained. The overall composition in the sintered compact is shown in Table 1. The obtained sintered compact was cut, and tensile test pieces and Ono type rotary bend fatigue test pieces were prepared. Test pieces of the example were treated in steam at 530° C. in a mesh belt furnace and pot furnace. In each test piece, the Vickers hardness, tensile strength, elongation, rotary bend fatigue strength, and fatigue limit ratio (rotary bend fatigue strength÷tensile strength) were measured. Metal texture of each test piece was magnified by 400 times and the taken images were analyzed by image analysis software (trade name: Win ROOF, produced by Mitani Inc.), and the area of pores and peripheral length of pores were measured, and the roundness was determined. The results are shown in Table 1.

In addition, for comparison with the present invention, mixed powder was adjusted by adding 0.75% zinc stearate powder to raw material powder for producing a mechanical fuse, which was previously proposed in Japanese Patent Publication No. 2002-168267A by the present applicants, and test pieces of conventional material were produced by the mixed powder under the same conditions as the above and the above tests were carried out. The results are shown in Table 1.

TABLE 1

| Samples Nos. | Mixed ratio (mass %) | | | | | | Overall Composition (mass %) | | | Evaluation Items | | | | | | |
|---|---|---|---|---|---|---|---|---|---|---|---|---|---|---|---|---|
| | Fe powder | Fe-P powder | P | Si powder | Fe-Si powder | Si | Fe | P | Si | Roundness of pores | Hardness Hv | Tensile strength MPa | Elongation % | Fatigue strength MPa | Fatigue limit ratio σw/σB | Notes |
| 01 | Balance | 0.0 | | | | | Balance | 0.0 | | 0.0052 | 75 | 110 | 1.2 | 50 | 0.45 | Outside lower limit of P and Si contents |
| 02 | Balance | 1.0 | 15.0 | | | | Balance | 0.15 | | 0.0132 | 104 | 172 | 0.9 | 105 | 0.61 | Within lower limit of P content |
| 03 | Balance | 3.0 | 15.0 | | | | Balance | 0.45 | | 0.0145 | 142 | 215 | 0.7 | 135 | 0.63 | |
| 04 | Balance | 7.0 | 15.0 | | | | Balance | 1.05 | | 0.0165 | 188 | 281 | 0.6 | 160 | 0.57 | |
| 05 | Balance | 10.0 | 15.0 | | | | Balance | 1.50 | | 0.0167 | 196 | 328 | 0.5 | 185 | 0.56 | Within upper limit of P content |
| 06 | Balance | 15.0 | 15.0 | | | | Balance | 2.25 | | 0.0170 | 216 | 380 | 0.5 | 195 | 0.51 | Outside upper limit of P content |
| 01 | Balance | | | 0.0 | | | Balance | | 0.0 | 0.0052 | 75 | 110 | 1.2 | 50 | 0.45 | Outside lower limit of P and Si contents |
| 07 | Balance | | | 2.0 | 20.0 | | Balance | | 0.4 | 0.0095 | 92 | 136 | 1.0 | 75 | 0.55 | Within lower limit of Si content |
| 08 | Balance | | | 4.0 | 20.0 | | Balance | | 0.8 | 0.0102 | 112 | 160 | 0.8 | 95 | 0.59 | |
| 09 | Balance | | | 8.0 | 20.0 | | Balance | | 1.6 | 0.0108 | 133 | 182 | 0.8 | 105 | 0.58 | |
| 10 | Balance | | | 10.0 | 20.0 | | Balance | | 2.0 | 0.0112 | 152 | 203 | 0.7 | 115 | 0.57 | Within upper limit of Si content |
| 11 | Balance | | | 12.0 | 20.0 | | Balance | | 2.4 | 0.0116 | 172 | 241 | 0.6 | 120 | 0.50 | Outside upper limit of Si content |
| 01 | Balance | | | | | 0.0 | Balance | | 0.0 | 0.0052 | 75 | 110 | 1.2 | 50 | 0.45 | Outside lower limit of P and Si contents |

TABLE 1-continued

| Samples Nos. | Mixed ratio (mass %) | | | | | | Overall Composition (mass %) | | | Evaluation Items | | | | | | Notes |
|---|---|---|---|---|---|---|---|---|---|---|---|---|---|---|---|---|
| | Fe powder | Fe-P powder | P | Si powder | Fe-Si powder | Si | Fe | P | Si | Round-ness of pores | Hard-ness Hv | Tensile strength MPa | Elon-gation % | Fatigue strength MPa | Fatigue limit ratio σw/σB | |
| 12 | Balance | | | 0.4 | | | Balance | | 0.4 | 0.0090 | 85 | 134 | 0.9 | 75 | 0.56 | Within lower limit of Si content |
| 13 | Balance | | | 0.8 | | | Balance | | 0.8 | 0.0103 | 104 | 158 | 0.8 | 90 | 0.57 | |
| 14 | Balance | | | 1.6 | | | Balance | | 1.6 | 0.0110 | 136 | 176 | 0.8 | 100 | 0.57 | |
| 15 | Balance | | | 2.0 | | | Balance | | 2.0 | 0.0120 | 152 | 198 | 0.7 | 110 | 0.56 | Within upper limit of Si content |
| 16 | Balance | | | 2.4 | | | Balance | | 2.4 | 0.0126 | 173 | 232 | 0.6 | 115 | 0.50 | Outside upper limit of Si content |
| 17 | Balance | 10.0 | 10.0 | 0.4 | | | Balance | 1.0 | 0.4 | 0.0173 | 198 | 336 | 0.7 | 190 | 0.57 | |
| 18 | Fe powder + 1.5% Cu powder + 0.5% Graphite powder | | | | | | Fe –1.5Cu–0.4C | | | 0.0138 | 115 | 280 | 1.0 | 145 | 0.52 | Conventional material |

(1) Effect of Addition of P

Figure 2:
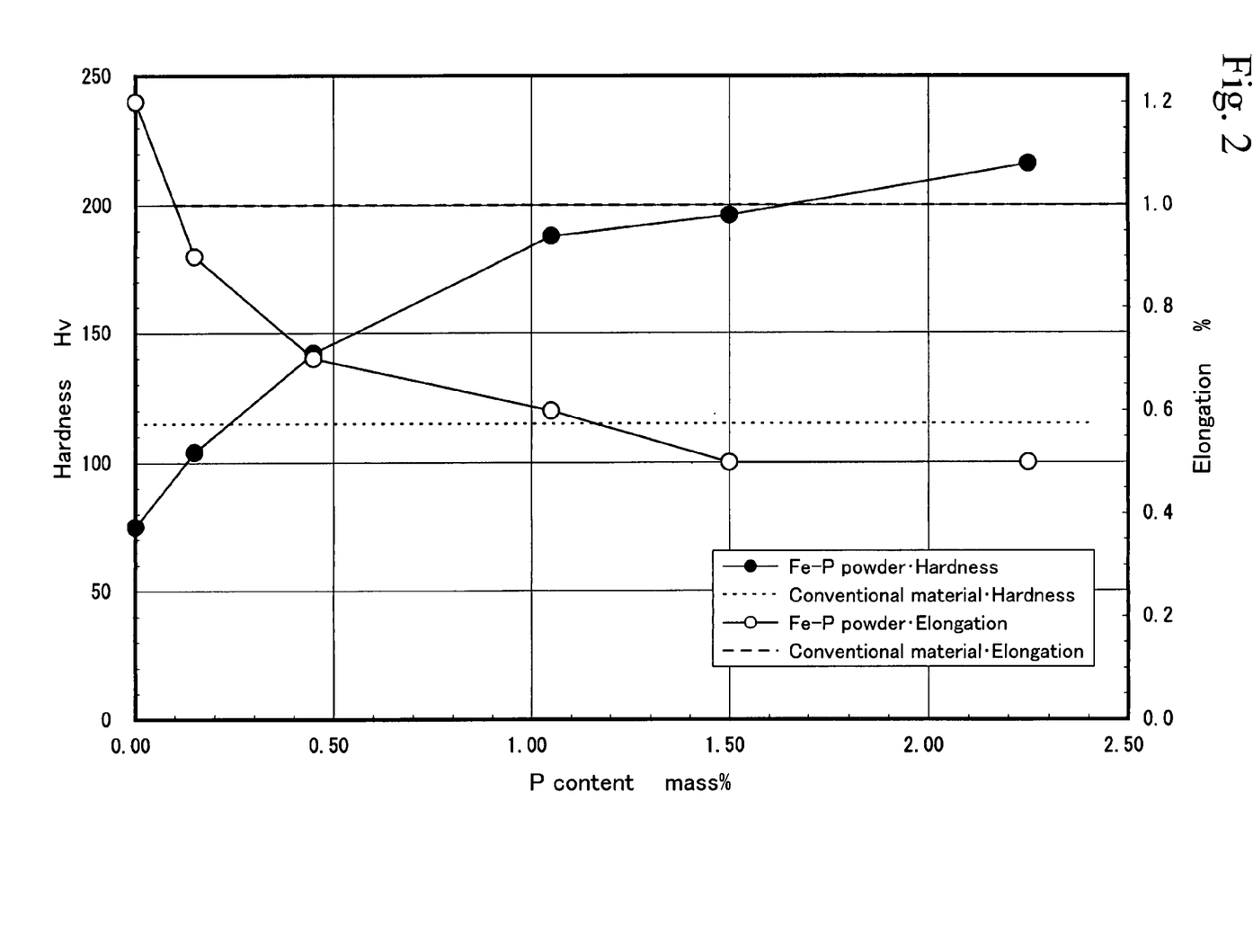
FIG. 2 is a diagram showing the relationship between P content and hardness or elongation in Examples of the present invention.
Figure 3:
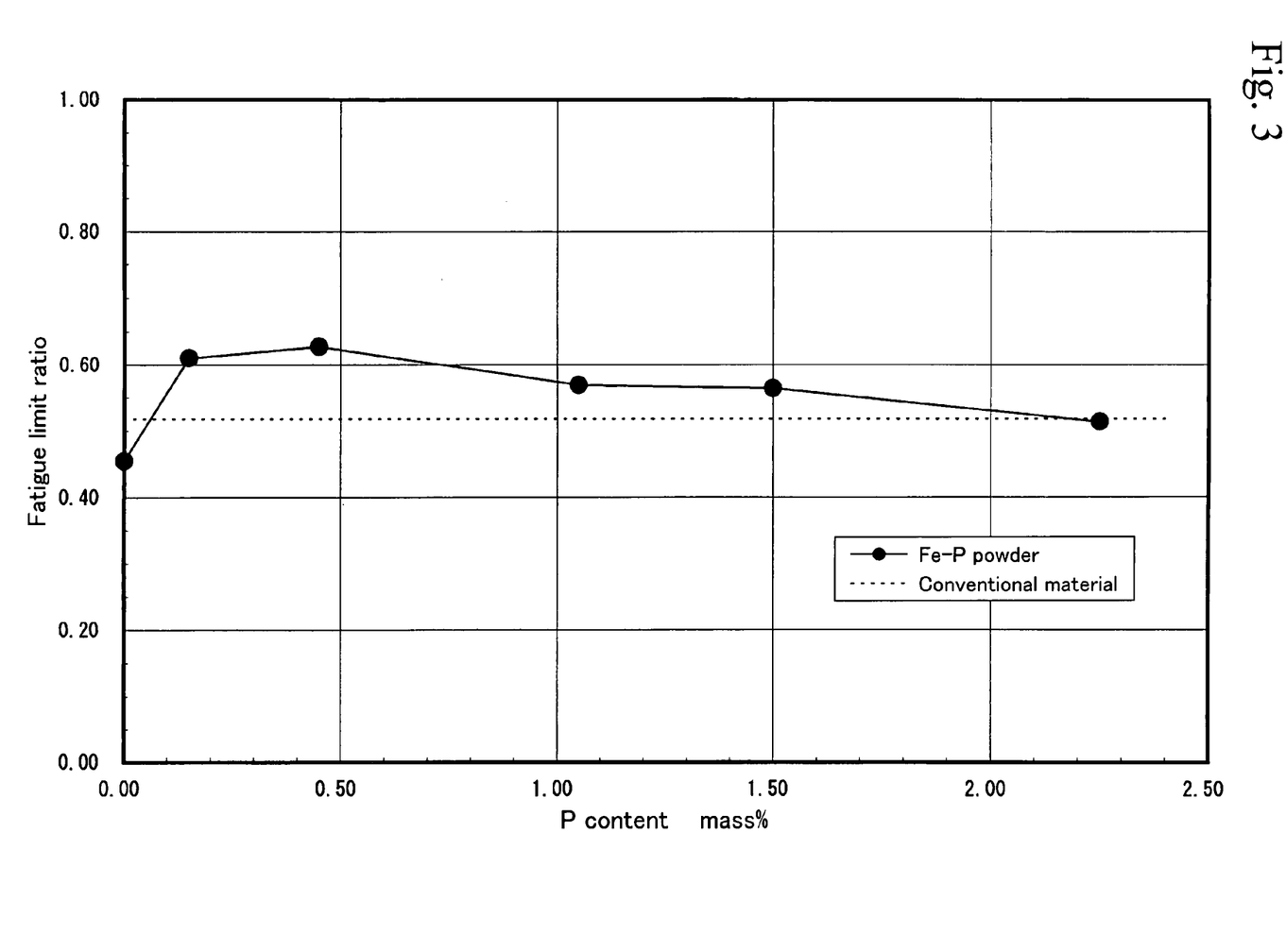
FIG. 3 is a diagram showing the relationship between P content and fatigue limit ratio in Examples of the present invention.

FIG. 2 shows the relationship between P content and hardness in Samples Nos. 1 to 6, and FIG. 3 shows the relationship between P content and fatigue limit ratio in Samples Nos. 1 to 6. As shown in FIG. 2, in Samples having P content of 0.15 to 1.5 mass %, hardness was higher than that of conventional materials, and moreover, elongation of most of Samples was minimal. Therefore, in mechanical fuses containing P at 0.15 to 1.5 mass %, it was supposed that fatigue strength varies little and fatigue limit ratio is stable. In addition, as shown in FIG. 3, in Samples having a P content of 0.15 to 1.5 mass %, fatigue limit ratio was higher than that of conventional materials.

(2) Effect of Addition of Si

Figure 4:
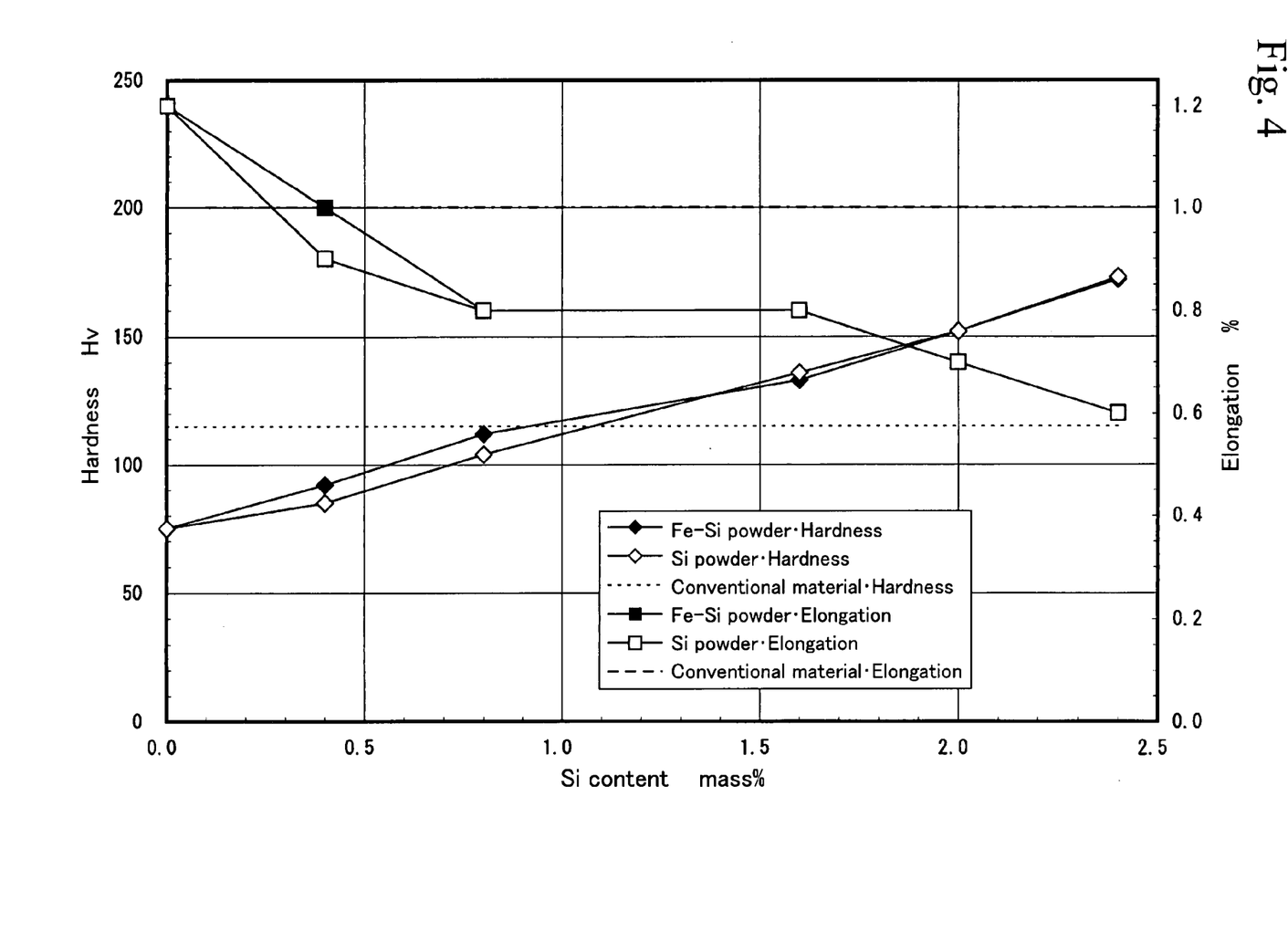
FIG. 4 is a diagram showing the relationship between Si content and hardness or elongation in Examples of the present invention.
Figure 5:
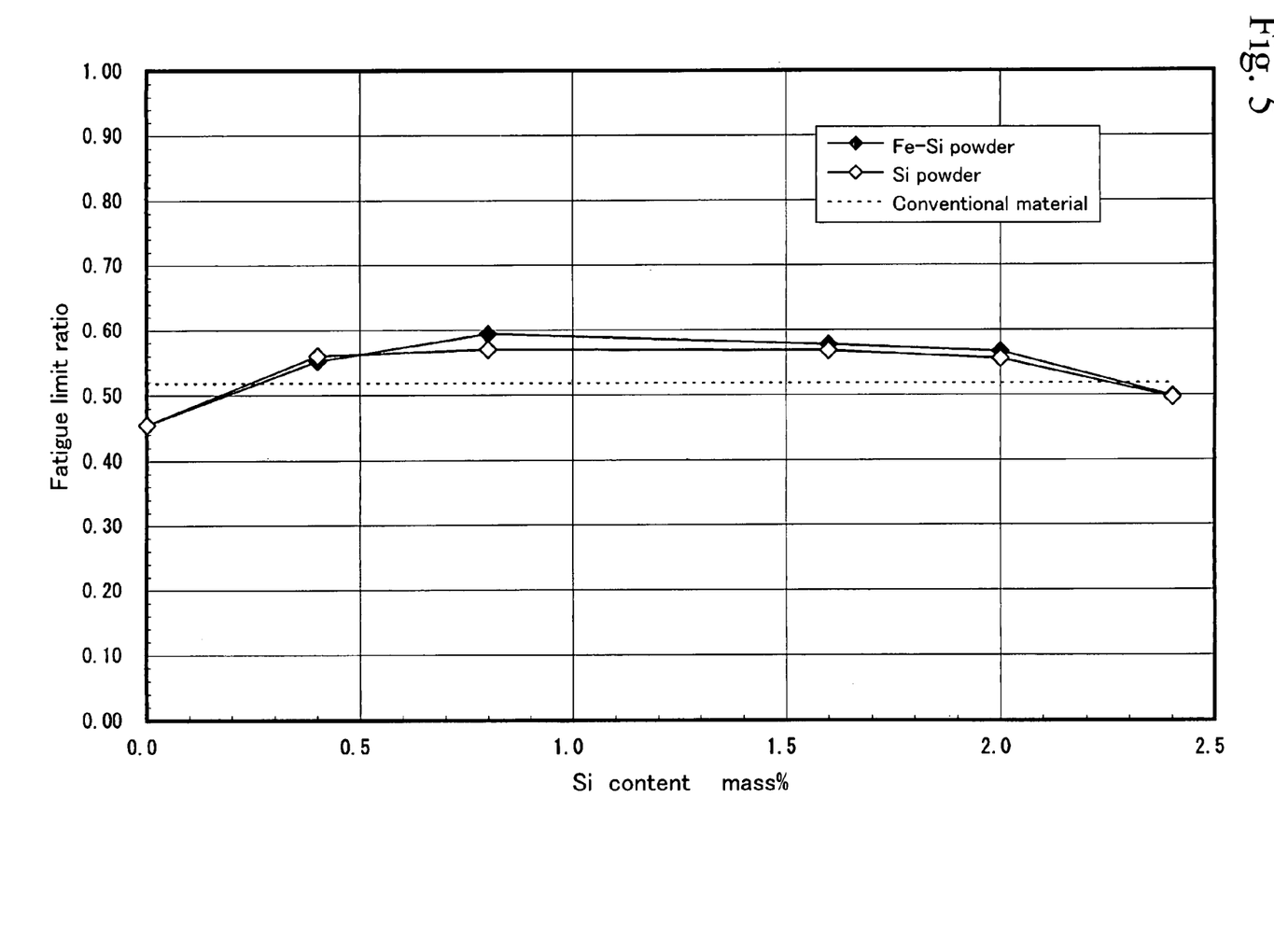
FIG. 5 is a diagram showing the relationship between Si content and fatigue limit ratio in Examples of the present invention.

With respect to some Samples which are picked up from Samples Nos. 7 to 19 with added Si, FIG. 4 shows the relationship between Si content and hardness, and FIG. 5 shows the relationship between Si content and fatigue limit ratio. As shown in FIG. 4, in Samples having a Si content of 0.4 to 2.0 mass %, hardness of most of Samples was higher than that of conventional materials, and moreover, elongation was slight. Therefore, in a mechanical fuse containing Si at 0.4 to 2.0 mass %, it was supposed that fatigue strength varies little and fatigue limit ratio is stable. In addition, as shown in FIG. 5, in Samples having a Si content of 0.4 to 2.0 mass %, fatigue limit ratio was higher than that of conventional materials.

What is claimed is:

1. A mechanical fuse consisting of Fe-based sintered alloy, consisting of at least one element of P at 0.15 to 1.5 mass %, and Si at 0.4 to 2.0 mass %, and the remainder consisting of Fe and inevitable impurities, wherein an iron oxide layer is formed on a pore inner wall, and the roundness of the pores is at least 0.004.

2. A mechanical fuse according to claim 1, wherein a treatment for providing residual compressive stress is applied.

3. A mechanical fuse according to claim 1, wherein a soft nitriding treatment is applied.

4. A mechanical fuse according to claim 1, wherein a zinc chromate film is formed on the surface of the mechanical fuse.

5. A mechanical fuse according to claim 1, wherein the mechanical fuse is interposed between two power transmission shafts and comprises an inner rim fixed to one power transmission shaft, an outer rim fixed to the other power transmission shaft, and plural arms for linking the inner rim and outer rim, which are formed integrally.

* * * * *